April 7, 1942.   R. D. EVANS ET AL   2,279,228
CONTROL SYSTEM
Filed Jan. 5, 1940

INVENTORS
Robert D. Evans and
Charles F. Wagner.
BY
ATTORNEY

Patented Apr. 7, 1942

2,279,228

UNITED STATES PATENT OFFICE 2,279,228

CONTROL SYSTEM

Robert D. Evans and Charles F. Wagner, Swissvale, Pa., assignors to Westinghouse Electric & Manufacturing Company, East Pittsburgh, Pa., a corporation of Pennsylvania Application January 5, 1940, Serial No. 312,510

8 Claims. (Cl. 172—237)

Our invention relates, generally, to control systems, and more particularly to a control system for limiting the transient torques incident to the starting and reversing of induction motors.

In many industrial applications of induction motors driving heavy loads and machinery having large inertia, considerable breakage of shafts and couplings has been experienced due to excessive torques produced when starting the motors or reversing the motors by reversing the power phase relation. It has been found that these excessive starting and reversing torques are transient in nature, are often several times the magnitude of the normal motor torque, and are effective over a period of several cycles.

An object of our invention is to provide a control system for induction motors which shall function to limit the transient starting and reversing torques of induction motors.

Another object of the invention is to provide a control system for induction motors which shall function to reduce the ratio of the maximum values of the transient starting and reversing torque to the useful starting and reversing torque of the motor.

A further object of the invention is to provide a control system for induction motors which shall function to limit the starting and reversing torques of the motors and to start and reverse the motors in a minimum period of time commensurate with the limited motor torques.

Figure 1:
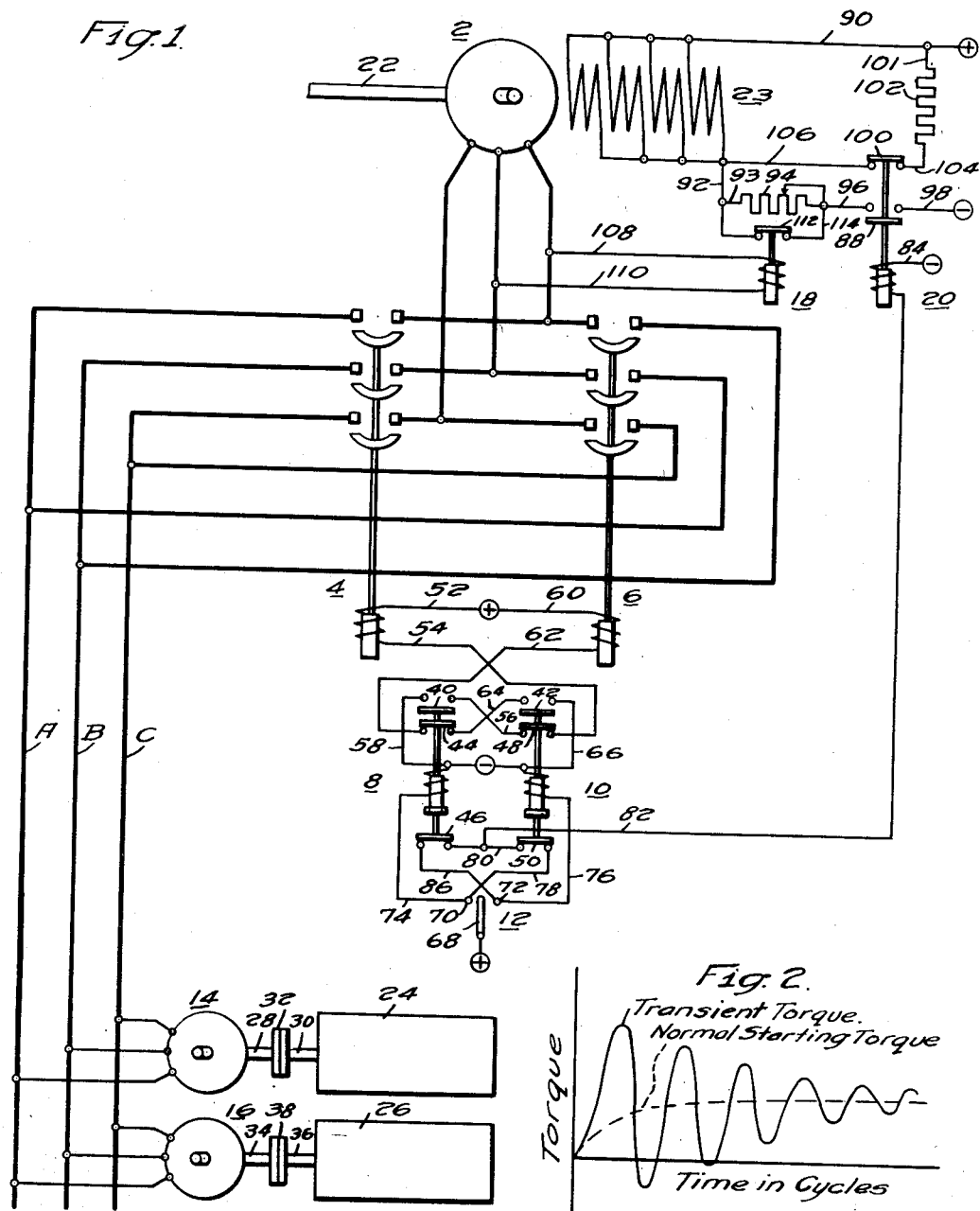
Figure 2:
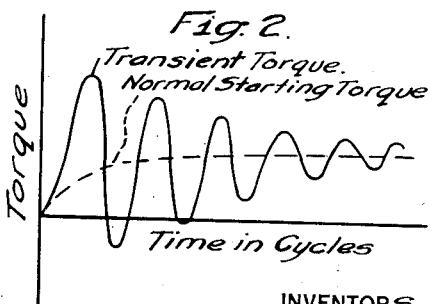

These and other objects and advantages will be apparent from the following detailed description taken in connection with the accompanying drawing, in which:

Figure 1 is a diagrammatic view of an induction motor control system embodying the principal features of our invention; and Fig. 2 is a graphical illustration of the transient torques previously encountered in starting and reversing induction motors.

In practicing our invention, we provide an alternating current generator 2 and circuit breakers 4 and 6 which may be selectively operated by means of relays 8 and 10 under the control of a selective control switch 12 to connect motors 14 and 16 to the generator 2 for rotation in a forward or reverse direction. Starting and reversing the motors 14 and 16 under load causes transient torques of excessive values as shown in Fig. 2. Relays 18 and 20 are provided for controlling the field winding of the generator 2 to provide quick reduction of the generator excitation and, therefore, its output potential at the time of reversal of the motor connections and quick build-up of the generator potential after the motors have been reversed.

The system for producing quick discharge of the generator field and quick build-up of the generator excitation and output potential may be designated as a quick-response excitation system.

Considering the control system more in detail, generator 2 may be driven by any suitable prime mover (not shown) through the shaft 22. The generator 2 is provided with a field winding 23 and may be connected by means of the circuit breakers 4 and 6 and a power bus indicated by the conductors A, B and C to energize the induction motors 14 and 16. The motors 14 and 16 are connected to drive a load such as the runout table rolls 24 and 26 through shafts 28 and 30 and coupling 32, and shafts 34 and 36 and coupling 38, respectively.

The control relays 8 and 10 for the circuit breakers 4 and 6 have front contact elements 40 and 42, respectively, and back contact elements 44 and 46 and 48 and 50, respectively. The front contact element 40 and the back contact element 48 control an energizing circuit for the closing coil of the circuit breaker 4 which extends from the positive terminal of a suitable source of electrical energy through the conductor 52, the winding of the closing coil of the circuit breaker 4, conductor 54, contact element 48, conductor 56, contact element 40, and conductor 58 to the negative terminal of the source of energy.

A similar circuit for the closing coil of the circuit breaker 6 is controlled by the contact elements 42 and 44. This circuit extends from the positive terminal of the source of energy through the conductor 60, the winding of the closing coil of the circuit breaker 6, conductor 62, contact element 44, conductor 64, contact element 42, and conductor 66 to the negative terminal of the source of energy.

The relays 8 and 10 may be selectively energized by the control switch 12 which comprises a contact element 68, movable to selectively engage contact elements 70 and 72. When the contact element 68 is moved to the left-hand position to engage the contact element 70, an energizing circuit is established for the winding of the relay 8 which extends from the positive terminal of the source of electrical energy through the contact elements 68 and 70, conductor 74, the winding of relay 8, and the conductor 58 to the negative terminal of the source of energy. A similar circuit is established for the relay 10 when the contact element 68 is moved to right-hand position into engagement with the contact element 72 which extends from the positive terminal of the source of energy through the contact elements 68 and 72, a conductor 76, the winding of the relay 10, and conductor 66 to the negative terminal of the source of energy.

Heretofore induction motors such as 14 and 16 have been started and/or reversed by selectively actuating circuit breakers such as 4 and 6 through relays 8 and 10 by such a switch as the selector switch 12. Where such starting and reversal of the motors has been effected with full output potential of the generator 2, excessive transient torques occur which severely strain the shafts and couplings between the motors and the driven load and often damage the shafts and couplings. The graph of Fig. 2 illustrates the nature of these transient torques. The graph shows one curve illustrating the transient torque and another curve illustrating the normal starting torque which occurs when full starting potential is applied to a locked rotor induction motor, simulating the conditions which are obtained when an induction motor is required to start or reverse a very heavy load. The transient torque reaches magnitudes of several times the normal locked rotor torque of the motor. Since the normal locked rotor starting torque is several times the normal operating torque of the motor, the transient starting torque is a very considerable multiple of the normal motor torque. That part of the applicants' control system which will be described in detail hereinafter is provided for limiting these transient torques while still providing a minimum of starting and/or reversing period for the motors 14 and 16.

The control relay 20 is connected to be energized in a circuit which extends from the positive terminal of the source of energy through the contact elements 68 and 70, conductor 78, contact element 50, conductors 80 and 82, the winding of the relay 20, and the conductor 84 to the negative terminal of the source of energy. The winding of the relay 20 may also be energized in a circuit which extends from the positive terminal of the source of energy through the contact elements 68 and 72, a conductor 86, the contact element 46, conductors 80 and 82, to the winding of the relay 20 and conductor 84 to the negative terminal of the source of energy. The relays 8 and 10 are slow-to-release relays so constructed as to close their front contacts and open their back contacts immediately upon energization of the relay windings but to delay the opening of the front contacts and the closure of the back contacts for a short period after deenergization of their windings.

The front contact 88 of the control relay 20 is disposed to connect the field windings 23 of the generator 2 in an energizing circuit which extends from the positive terminal of a source of direct current energy through a conductor 90, the windings 23, conductors 92 and 93, a resistor 94, conductor 96, the contact element 88, and a conductor 98 to the negative terminal of the source of energy.

The back contact element 100 of the relay 20 is disposed to control a discharge circuit for the field windings 23 which extends from one side of the field windings 23 through the conductors 90 and 101, a resistor 102, conductor 104, contact element 100, and a conductor 106 to the other side of the field windings 23.

The field windings 23 of the generator 2 comprise a series of coils connected in parallel circuit relation so as to reduce the total effective inductance of the field winding, thereby to permit a more rapid discharge of the residual energy in the field winding through the resistor 102. This method of securing quick response of the generator excitation system is merely illustrative of one system which will provide quick excitation response. Any system that will reduce the ratio of the inductance to the resistance of the circuit will increase the speed of response of the circuit and produce the desired quick discharge of the field circuit.

The winding of the relay 18 is connected to be energized through conductors 108 and 110 from one phase of the generator 2 and is so constructed as to maintain its back contact element 112 in open circuit position when approximately normal potential is being generated by the generator 2. The contact element 112 controls a shunting circuit for the resistor 94 which extends from one side of the resistor 94 to the conductors 96 and 114, the contact element 112 and conductors 92 and 93 to the other side of the resistor 94. The resistor 94 may be so adjusted as to provide normal excitation for the generator 2 when the contact element 88 is in closed circuit position and the contact element 112 is in open circuit position. When the contact element 112 is in closed circuit position, greater than normal energizing current for the field winding 23 will be provided to effect a rapid build-up of the excitation of the generator 2.

The system comprising the discharge resistor 102, the back contact element 100 of the relay 20, and the connections providing a quick discharge circuit for the field windings 23 of the generator 2, and the front contact element 88 of the relay 20 and the relay 18 for effecting a rapid build-up of the excitation of the generator 2, may be designated as a quick-response excitation system for the generator 2. It is to be understood that the specific quick-response excitation system described herein is merely illustrative of one practical means for producing the desired functioning, and that other means may be employed to produce similar results.

In the operation of the system, when it is desired to start the motors 14 and 16, assuming the elements of the system are in the position indicated in the drawing, the contact element 68 may be moved to the left-hand position into engagement with the contact element 70, thus energizing the relay 8 and causing it to complete the energizing circuit for the winding of the closing coil of the circuit breaker 4. At the same time the energizing circuit for the relay 20 will be completed, causing the contact element 88 to move to closed circuit position. The contact element 112 will remain in closed circuit position, thus providing a greater than normal energization of the field winding 23 to insure a quick build-up of the excitation of the generator 2 until the output potential of the generator 2 has reached such a value as to actuate the relay 18 and move the contact element 112 to open circuit position, thus restoring the energization of the field winding 23 to normal. By these operations, it will be seen that the motors 14 and 16 will be connected to the generator simultaneously with the beginning of the excitation of the generator so that there will be no initial generator potential to cause the excessive transient torques illustrated in Fig. 2 and that thereafter the output potential of the generator 2 will be built up rapidly to provide quick starting of the motors 14 and 16.

If now it is desired to reverse the direction of rotation of the motors 14 and 16, the contact element 68 may be moved to the right-hand position into engagement with the contact element 72. This will deenergize the relay 8 and energize the relay 10. After a predetermined interval, the front contact element 40 of the relay 8 will move to open circuit position to deenergize the closing winding of the relay 4, and the contact elements 44 and 46 will move to closed circuit position to complete the hereinbefore described energizing circuits for the closing coil winding of the circuit breaker 6 and the winding of the relay 20. During the interval that the relay 20 has been deenergized, its contact element 100 will have closed the discharge circuit for the field winding 23, thus decreasing the excitation of the generator 2 and decreasing its output potential, thereby causing the contact element 112 to move to closed circuit position. Immediately upon the reenergization of the relay circuit, however, the discharge circuit of the field winding 23 will be opened by the contact element 100 and the energizing circuit for the field winding 23 will be closed by the contact element 88. The excitation of the generator 2 will thereafter be rapidly built up by greater than normal energization of the field winding 23 until its output potential is substantially normal, energizing the relay 18 which opens the shunting circuit for the resistor 94 by moving the contact element 112 to open circuit position, thereby restoring the field winding 23 to normal energization. Thus, upon reversal of the control switch 12, the field winding 23 of the generator 2 will be discharged. The generator 2 meanwhile will be left connected to the motors 14 and 16 so that the motors may assist in quickly reducing the generator excitation, thus supplementing the action of the discharge circuit for the field winding 23. At the end of the delayed release interval of the relay 8, the circuit breaker 4 will be opened and the circuit breaker 6 closed to reverse the motors 14 and 16, and simultaneously therewith the field winding 23 of the generator 2 will be quickly brought up to normal by the action of the relays 20 and 18 as hereinbefore described.

The control system will operate in a similar manner in reversing the direction of rotation of the motors 14 and 16 in the opposite direction.

As described hereinbefore, the system functions to simultaneously connect the motor for energization by the generator and connect the field winding of the generator for energization. The essential action in the connection of the motors, whether in starting or reversing, is that the motors be connected so as to be energized by the generator before the excitation of the generator has been built up to such a value as to produce excessive transient starting torque. Accordingly, the generator field winding may be energized slightly in advance of the connection of the motor to the generator by any suitable time delay means. This may be done by any suitable means for delaying the closure of the contact elements 44 and 48 after the closure of contact elements 46 and 50, respectively, or by any other suitable means.

Thus, it will be seen that we have provided a control system for limiting the transient torques incident to starting and reversing induction motors and which shall function to start and/or reverse the induction motors in a minimum time commensurate with the limited transient torque.

In compliance with the requirements of the patent statutes, we have shown and described herein a preferred embodiment of our invention. It is to be understood, however, that the invention is not limited to the precise construction shown and described but is capable of modification by one skilled in the art, the embodiments herein shown being merely illustrative of the principles of our invention.

We claim as our invention:

1. In a control system, a generator, a motor which is energized by the generator, means for reducing the field energization of the generator, means for thereafter substantially simultaneously reversing the energization of the motor and applying a greater-than-normal energization to the field winding of the generator until the generator output potential reaches a predetermined value, and means responsive to the generator output potential for providing normal energization of the generator field winding.

2. In a control system, in combination, an induction motor, a generator connected to energize the motor and having field windings comprising a plurality of coils connected in parallel circuit relation, a discharge circuit for the field windings of said generator, manual means for opening the energizing circuit and closing the discharge circuit for the generator field windings to thereby quickly decrease the energization of the field windings, means responsive to the actuation of said manual means for reversing the connections from the generator to the motor a predetermined time after the operation of the field discharge means, means responsive to the actuation of said manual means for reenergizing the generator field winding with a greater-than-normal energization substantially at the time the motor connections are reversed, and means for restoring normal energization to the generator field winding after a predetermined interval.

3. In a control system, in combination, an induction motor, a generator connected to energize the motor and having field windings comprising a plurality of field coils connected in parallel circuit relation, a discharge circuit and an energizing circuit for the generator field windings, a relay having front and back contacts controlling said energizing circuit and said discharge circuit, respectively, means for reversing the connections between said generator and the motor, a control device, means responsive to the operation of said control device for deenergizing said relay and for actuating said reversing means after a predetermined time, means responsive to the actuation of said reversing means and said control device for reenergizing said relay, and means responsive to the output potential of said generator for so modifying said generator field energizing circuit as to effect a greater-than-normal generator field energization while said relay is energized and the output potential of said generator is below a predetermined amount, whereby the motor will be reversed without excessive transient torque and in a minimum period of time.

4. In a control system, an induction motor, a generator for energizing the motor, a manually actuable quick response system for reducing the excitation and then increasing the excitation of the generator in response to the initial manual actuation, means responsive to the initial manual actuation for disconnecting the motor from the generator and means responsive to the initial manual actuation for thereafter automatically connecting the motor to the generator for energization in a reverse direction before the excitation of the generator has increased to such an amount as to cause excessive transient motor torque.

5. In a control system, an induction motor, an alternating current generator for energizing the motor, manually actuable means for reversing the energization of the motor, and means responsive to the actuation of the reversing means for reducing the field energization of the generator when said reversing means is actuated and thereafter automatically increasing the generator excitation to normal.

6. In a control system, the combination with an induction motor and an alternating current generator for energizing the motor, of manually operable means for reversing the energization of the motor, means responsive to the actuation of said manually operable means for reducing the field energization of the generator, and means responsive to the potential of the generator for providing a greater than normal energization of the generator field winding until the output potential of the generator has reached a predetermined value.

7. In a control system, a motor, a generator for energizing the motor, manually operable means for reducing the field energization of said generator, means responsive to the actuation of said manually operable means operable at a predetermined time after the actuation of said manually operable means for substantially simultaneously reversing the energization of the motor and applying a greater-than-normal energization to the field winding of the generator for a limited interval.

8. In a control system, a generator, an induction motor which is energized by the generator, manually operable means for deenergizing the field winding of the generator, means responsive to the actuation of said manually operable means automatically reversing the connections to the motor a predetermined time after actuation of said manually operable means, means responsive to the actuation of said manually operable means automatically reenergizing the field winding of the generator with a greater-than-normal energization substantially at the time the motor connections are reversed, and means responsive to the generator potential for automatically returning the generator field energization to normal after a predetermined generator potential has been established.

ROBERT D. EVANS.
CHARLES F. WAGNER.